Figure 1:
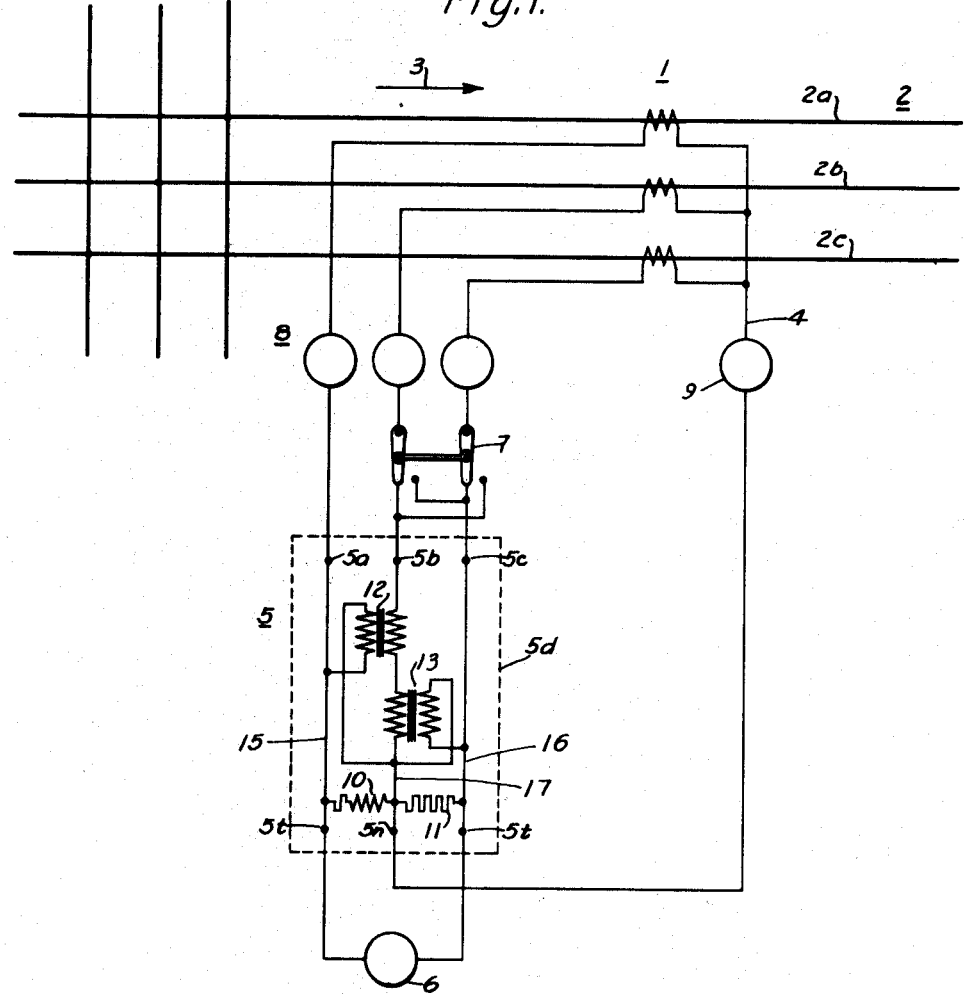

May 7, 1935.  W. A. LEWIS, JR  2,000,767
PHASE SEQUENCE APPARATUS
Filed Dec. 28, 1933  2 Sheets-Sheet 1

WITNESSES:

INVENTOR
William A. Lewis, Jr.
BY
ATTORNEY

Patented May 7, 1935

2,000,767

UNITED STATES PATENT OFFICE 2,000,767

PHASE SEQUENCE APPARATUS

William A. Lewis, Jr., Wilkinsburg, Pa., assignor to Westinghouse Electric & Manufacturing Company, East Pittsburgh, Pa., a corporation of Pennsylvania Application December 28, 1933, Serial No. 704,309

8 Claims. (Cl. 175—294)

My invention relates to polyphase alternating current apparatus and particularly to phase sequence filters for segregating symmetrical components of polyphase alternating variables. In accordance with the symmetrical component relationships originally deduced by Dr. C. L. Fortescue and now extensively used in the alternating current art, any unbalanced three phase system of alternating variables may be completely expressed as three symmetrical systems of components known as the positive, negative and zero sequence systems. These systems of components are in reality dimensions of the polyphase variable which express totalized properties of all three phases, rather than individual properties of the separate phases. For example, the zero sequence components are proportional to the so called "residual" or ground part of the polyphase variable; the ratio of negative sequence components to positive sequence components is a measure of the degree of unbalance of the polyphase variable, etc. By means of suitable apparatus such as static impedance networks or filters, one or more of the symmetrical components of polyphase variables occurring in any polyphase circuit may be segregated and used for metering, protective or general control purposes. In such applications it is often necessary to suppress or eliminate zero sequence current components from parts of the control circuits, to prevent these components from affecting relays or meters responsive to positive or negative sequence currents.

The zero sequence current components can be eliminated by means of four insulating current transformers connected in a manner well known in the art. In this arrangement, however, the star currents cannot be measured, and for high voltage applications the cast of the fourth insulating current transformer becomes an undesirable factor. For high voltage applications, a more satisfactory arrangement is obtained with three insulating current transformers having their secondaries connected in star, and four auxiliary current transformers connected to the star connected secondaries.

My invention, in one aspect, is an improvement on the latter arrangement for eliminating zero sequence current components. In accordance with my invention, measurements of phase currents and the segregation of zero sequence currents for phase sequence measurements are both made possible by means of three insulating current transformers and two auxiliary transformers.

In another aspect, my invention is particularly suitable for applications in which an instrument torque or force of moderate value must be obtained with a minimum instrument transformer burden; an example of such applications being high voltage apparatus of the type in which protective relays are energized by means of bushing type current transformers or bushing potential devices. In such applications, it has heretofore been difficult or impractical to supply phase sequence apparatus from the bushing type apparatus because of the excessive burden imposed by the phase sequence filter. In accordance with my invention, the constants of the filter are so related to the constants of the relay or other electroresponsive device that the burden imposed by both together is a minimum for a given volt-ampere supply to the relay. In this way the burden may, in a majority of instances, be reduced below the safe working limit for bushing type current transformers and bushing potential devices, thereby permitting operation of phase sequence devices from the bushing type apparatus.

It is, accordingly, an object of my invention to provide a novel phase sequence current filter unit which shall require a minimum number of auxiliary transformers.

Another object of my invention is to provide a novel arrangement of a phase sequence filter and an electroresponsive device which shall produce a maximum torque or force of the electroresponsive device for a given instrument transformer burden.

A further object of my invention is to provide a novel phase sequence filter which shall operate with maximum apparent or volt-ampere efficiency.

Other objects of my invention will become evident from the following detailed description taken in conjunction with the accompanying drawings, in which Figure 1 is a diagrammatic view of a current responsive phase sequence arrangement embodying my invention.

Figure 2:
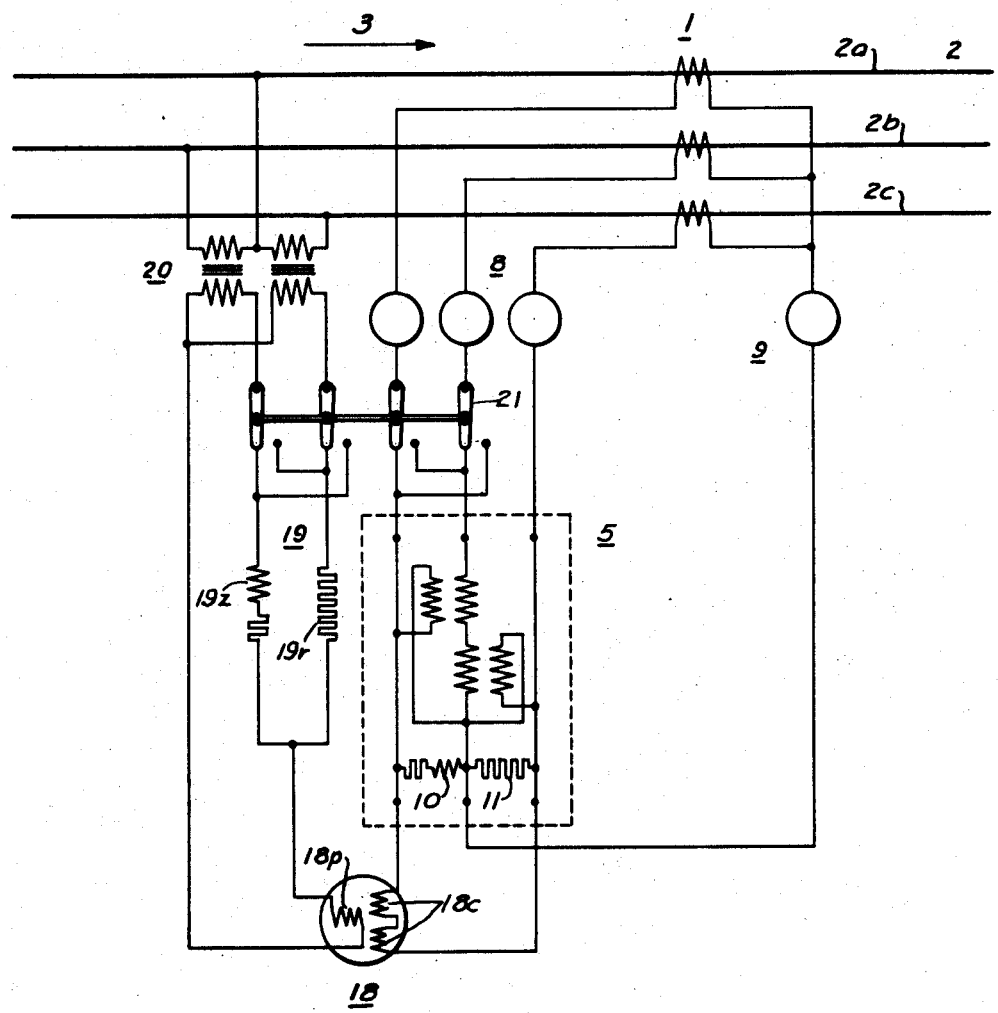

Fig. 2 is a diagrammatic view of a power-responsive phase sequence arrangement embodying my invention.

Referring to Fig. 1 of the drawings in detail, a set of line current transformers 1, of any suitable high voltage type, are connected in a three-phase alternating current circuit 2, which may be a three-phase grounded-neutral transmission line or a high voltage feeder. The normal phase sequence of the phase currents in the circuit 2 is indicated by the subscripts a, b and c of the conductors 2a, 2b and 2c, and the normal direction of power flow is indicated by the arrow 3.

The secondary windings of the line transformers 1 are connected together at one end to form a star point which is connected to a neutral conductor 4 which is usually grounded. The remaining ends of the secondary windings of the transformers 1 are connected in separate circuits to three terminals 5a, 5b and 5c of a phase sequence filter constructed in accordance with my invention. In addition to the terminals 5a, 5b and 5c, the phase sequence filter 5 is provided with a neutral terminal 5n to which the neutral conductor 4 is connected, and with a pair of output terminals 5t to which an electroresponsive device 6 is connected. The device 6 may be any single phase relay, meter or other translating device which is to be energized in accordance with a positive or negative sequence component of the polyphase current of the circuit 2.

A two pole reversing switch 7, or equivalent, may be included in series with the secondary windings of two of the transformers 1 for reversing the phase sequence of currents circulated through the filter 5, to thereby change the output current circulated through the device 6 from positive sequence to negative sequence, or vice versa, as will be hereinafter more fully explained.

Apparatus responsive to the individual phase currents of the circuit 2, such as phase relays, may be included in series with the secondaries of the line transformers 1 individually, as indicated at 8. Apparatus responsive to the zero sequence current or ground current of the circuit 2 may be included in series with the neutral conductor 4 as shown at 9. It will be understood, of course, that if the current transformers 1 are of the bushing type, the additional meters or relays 8 and 9 are preferably omitted to reduce the current transformer burden.

The phase sequence filter 5 comprises a pair of impedance elements 10 and 11 and a pair of 5:5 ratio auxiliary current transformers 12 and 13, which are all preferably mounted on a base panel 5d to form a compact unit. The primary windings of the auxiliary transformers 12 and 13 are connected in series with a secondary winding of one of the insulating current transformers 1, such as that for the b-phase, and the secondary windings of the auxiliary transformers 12 and 13 are connected in reversed open V between the b-phase conductor and the remaining two phase conductors.

The impedances of the elements 10 and 11 have the same absolute magnitudes, but the impedance phase angle of the element 10 is displaced by 60° in the positive or inductive direction from that of the element 11. For example, if the element 11 is a resistor, as shown, the element 10 must be an inductive impedance having a lagging phase angle of 60°. Obviously the impedance elements 10 and 11 may be of other types such that they have equal absolute magnitudes, and the 60° phase relationship indicated above is satisfied.

The proportioning of the V-connected impedance elements such as 10 and 11, in the manner indicated above, is well known and results in the segregation of either positive or negative sequence components, depending upon the phase order of the connections to the V. In accordance with my invention, a further relationship between the absolute impedance of either of the elements 10 or 11 and the impedance of the device 6 is maintained to produce maximum torque or force of the device 6 for a given current transformer burden. This relationship is that the absolute impedance of the device 6 is $$\frac{\sqrt{3}}{}$$

times as large as the absolute impedance of either impedance element 10 or 11 of the filter 5. I have found that this relationship results in a maximum value of the ratio of the volt ampere supply to the device as compared with the total burden of the filter and the device, where the filter impedances (such as 10 and 11) are connected in delta with the translating device (such as 6). Where the filter impedances are connected in star with the translating device, for instance in single-element voltage filters for use in three-phase systems, an example of which will be hereinafter described in connection with Fig. 2, the factor $$\sqrt{3}$$

appears in the denominator, that is, the absolute impedance of the device must be $$\frac{1}{\sqrt{3}}$$

times as large as the absolute impedance of either of the filter impedance elements for maximum volt ampere efficiency.

The operation of the above described apparatus may be set forth as follows: It is assumed that power is flowing in the circuit 2 in the direction indicated by the arrow 3, that the phase currents in the circuit 2 are unsymmetrical and that zero sequence current is present, that is, that the phase currents in the circuit 2 do not add vectorially to zero. The current transformers 1 operate in the usual manner to maintain currents in their secondary circuits proportional to the phase currents of the circuit 2. The auxiliary transformers 12 and 13 operate to divert the zero sequence current components away from the impedance elements 10 and 11 and into the neutral conductor 4, as may be seen from a mathematical consideration of the circuit.

Let $I_a$
$I_b$ = currents entering the filter 5 at terminals 5a, 5b and 5c respectively
$I_c$ $Re^{i\theta}$ = impedance of the resistance element 11, where $\theta$ is the impedance phase angle of the element 11

$Re^{i(\theta+60)}$ = impedance of the impedance element 10

$Me^{i\mu}$ impedance of the device 6

$I_{15}$ = current in the conductor 15
$I_{16}$ = current in the conductor 16
$a$ = 120° operator $e^{j120} = -.5 + j.866$
$e$ = the base of natural logarithms, and
$j$ = the imaginary $\sqrt{-1}$.

The current in conductor 15 is, because of the reversed connection of auxiliary transformer 12, $$I_{15} = I_a - I_b \quad \text{(1)}$$

Similarly the current in conductor 16 is $$I_{16} = I_c - I_b \quad \text{(2)}$$

The current in the device 6 is $$I_6 = \frac{I_{15}Re^{i(\theta+60)} - I_{16}Re^{i\theta}}{Re^{i\theta}(1+e^{i60}) + Me^{i\mu}} \quad \text{(3)}$$

Substituting (1) and (2) in (3)

$$I_6 = \frac{(I_a - I_b)Re^{i(\theta+60)} - (I_c - I_b)Re^{i\theta}}{Re^{i\theta}(1+e^{i60}) + Me^{i\mu}} \quad \text{(4)}$$

However, from the symmetrical component relationships the currents $I_a$, $I_b$ and $I_c$ may be represented as $$\left.\begin{array}{l}I_a = I_{a1} + I_{a2} + I_{a0}\\ I_b = a^2 I_{a1} + a I_{a2} + I_{a0}\\ I_c = a I_{a1} + a^2 I_{a2} + I_{a0}\end{array}\right\} \quad (5)$$

where $I_{a0}$ = the $a$-phase zero sequence component
$I_{a1}$ = the $a$-phase positive sequence component
$I_{a2}$ = the $a$-phase negative sequence component substituting (5) in (4)

$$I_t = \frac{Re^{i\theta}\{I_{a1}[(1-a^2)e^{i\mu} - (a-a^2)] + I_{a2}[(1-a)e^{i\mu} - (a^2-a)]\}}{Re^{i\theta}(1 + e^{i\mu}) + Me^{i\mu}} \quad (6)$$

Multiplying (6) out and collecting terms, the $I_{a1}$ terms cancel leaving $$I_t = \frac{-3a^2 Re^{i\theta} I_{a2}}{Re^{i\theta}(1 + e^{i\mu}) + Me^{i\mu}} \quad (7)$$

From (7) it may be seen that both the zero sequence components and positive sequence components are eliminated from the current supplied to the device 6, causing the latter to respond to negative sequence current only. By moving the reversing switch 7 from the position shown to its remaining position, the device 6 may be caused to respond to positive sequence current only, as is the case in similar filters known in the art.

The proof of the $$\sqrt{3}$$

relationship pointed out above is rather involved and will, for simplicity, be only outlined in the following.

Denoting the volt ampere consumption of the device 6 by $U_m$ and the volt ampere product traversing the conductors 16 and 17, that is, the scalar product of the current in the conductor 16 and the voltage between the conductors 16 and 17 by $U_c$, it may be shown that for the condition of absence of either positive or negative sequence current in the circuit 2, $$\frac{U_m}{U_c} = \frac{3m}{(m^2 + 3m \cos \mu - \sqrt{3} m \sin \mu + 3)^{\frac{1}{2}}(m^2 + 3 + 3 + 2m\sqrt{3} \sin \mu)^{\frac{1}{2}}} \quad (8)$$

where $m$ is the scalar ratio of M to R.

Taking the partial derivative of (8) with respect to $m$, a biquadratic in $m$ is obtained which may be resolved into the four roots:

$$m = \sqrt{3}$$

$$m = -\sqrt{3}$$

$$m = -\frac{(3\cos\mu + 3\sqrt{3}\sin\mu) + \sqrt{9(\cos\mu + \sqrt{3}\sin\mu)^2 - 48}}{4}$$

$$m = -\frac{(3\cos\mu + 3\sqrt{3}\sin\mu) - \sqrt{9(\cos\mu + \sqrt{3}\sin\mu)^2 - 48}}{4}$$

As $m$ is assumed as a positive scalar, the last three roots, which are either negative or complex have no physical significance. The root $$m = \sqrt{3}$$

accordingly expresses the maximum condition for the ratio $$\frac{U_m}{U_c}$$

Similarly it may be shown that the ratios $$\frac{U_m}{U_a} \text{ and } \frac{U_m}{U_a + U_c}$$

are maximums under the same conditions, where $U_a$ is the scalar product of current in the conductor 15 and voltage between the conductors 15 and 17.

In some applications, particularly where it is desired to measure positive or negative sequence power, it is necessary to obtain a symmetrical current component having a predetermined phase relationship to a given reference component, such as the $a$-phase negative sequence component. In the apparatus shown in Fig. 1, the phase position of the current supplied to the device 6 may be rotated in steps of 120° by interchanging the connections to the terminals 5a, 5b and 5c without changing their order. By reversing the connections of the device 6 to the terminals 5t, a change of 180° in the phase position of the current is obtained, and this change together with the 120° changes indicated above may be used to cover the entire 360° range in 60° steps. Changes of less than 60° may be obtained by using impedance elements of other types than a resistor and inductive reactor.

Fig. 2 shows an application of my invention to power responsive apparatus, for obtaining response of a translating device in accordance with a positive or negative sequence power product. Referring to Fig. 2, a power responsive translating device 18, having a potential winding 18p and a pair of current windings 18c, is connected to a phase-sequence current filter 5 and a phase-sequence voltage filter 19, to be energized therefrom. The filter 5 is in all respects the same as the corresponding element of Fig. 1 and is connected to the current transformers 1 and translating devices 8 and 9 in the manner described in connection with Fig. 1.

The potential winding 18p of the translating device 18 is connected to phase-sequence voltage filter 19 to be energized in accordance with the positive or negative sequence voltage of the power circuit 2. The filter 19 preferably comprises a resistor 19r and an inductive impedance 19z, of the same absolute impedance but differing in impedance phase angle by 60°, in a manner well understood in the art. The impedance elements 19r and 19z are connected to a pair of insulating voltage transformers 20 in the usual manner.

In order to obtain maximum volt-ampere efficiency for the voltage connections, the absolute impedance of the potential winding 18p is equal to $$\frac{1}{\sqrt{3}}$$

times the absolute impedance of either impedance element 19r or 19z. As mentioned above, the factor $$\sqrt{3}$$

appears in the denominator where impedance elements and translating device are connected in star, as in the voltage connections shown. The impedances of the delta arrangement 10, 11 and 18c are proportioned in the manner indicated in Fig. 1.

A four pole reversing switch 21, may be provided for changing the connections of both the current filter 5 and the voltage filter 19, to thereby change the variable which controls the translating device 18 from a negative sequence power product to a positive sequence power product or vice versa. With the switch 21 in the position shown, the translating device 18 would be energized in accordance with a product of negative sequence current and negative sequence voltage vectors of the power circuit 2. With the switch 21 in its remaining position, the translating device 18 would respond to a product of positive sequence current and positive sequence voltage vectors of the power circuit 2.

I do not intend that the present invention shall be restricted to the specific structural details, arrangement of parts or circuit connections herein set forth as various modifications thereof may be effected without departing from the spirit and scope of my invention. I desire, therefore, that only such limitations shall be imposed as are indicated in the appended claims.

I claim as my invention:

1. In phase sequence apparatus having phase conductors comprising a three-phase input circuit and having an output circuit in electrical communication with said input circuit, means for preventing zero sequence currents of said input circuit from traversing said output circuit comprising a pair of current transformers each having a winding connected in series with one of said phase conductors and an additional winding, said additional windings being connected between said one of said phase conductors and the remaining phase conductors of said input circuit.

2. In phase sequence apparatus associated with a three-phase alternating-current circuit, a set of line current transformers included in said circuit, said transformers having secondary circuits connected at one end to form a star point, an output circuit in electrical communication with said secondary circuits, a pair of auxiliary current transformers for preventing zero sequence currents of said secondary circuits from traversing said output circuit, each of said auxiliary transformers having a winding connected serially in a predetermined one of said secondary circuits and an additional winding, said additional windings being connected between said predetermined one of said secondary circuits and the remainder of said secondary circuits, and a conductor completing a neutral connection between said star point and said predetermined one of said secondary circuits.

3. In phase sequence apparatus associated with a three-phase alternating-current circuit, a phase sequence filter having a pair of impedance branches of substantially equal absolute impedance value, said branches having impedance phase angles differing by substantially 60°, instrument transformer apparatus for supplying said filter, and an electroresponsive device connected to said filter to respond to a symmetrical component of a polyphase condition of said circuit, the absolute impedance of said device being related to the absolute impedance of one of said branches by a factor substantially equal to $$\sqrt{3}$$

in such manner that the volt ampere supply to said device is substantially maximum for a given burden on said instrument transformer apparatus.

4. In phase sequence apparatus associated with a three-phase alternating-current circuit, a current phase sequence filter having a pair of impedance branches of substantially equal absolute impedance value, said branches having impedance phase angles differing by substantially 60°, current transformer apparatus for supplying said filter, and an electroresponsive device connected to said filter to respond to a symmetrical component of the polyphase current of said circuit, the absolute impedance of said device being substantially $$\sqrt{3}$$

times the absolute impedance of one of said branches, whereby the volt ampere supply to said device is substantially maximum for a given burden on said current transformer apparatus.

5. In phase sequence apparatus associated with a three-phase alternating-current circuit, a set of line current transformers included in said circuit, said transformers having a first secondary circuit, a second secondary circuit and a third secondary circuit connected at one end to form a star point, a pair of auxiliary current transformers, each of said auxiliary transformers having a winding connected serially in said first secondary circuit and an additional winding, said additional windings being connected between said first secondary circuit and said second and third secondary circuits, respectively, an impedance branch circuit connected between said first and second secondary circuits, an impedance branch circuit connected between said first and third secondary circuits, said branch circuits having substantially equal absolute impedance values and having impedance phase angles differing by substantially 60°, an electroresponsive device connected between said second and third circuits, the absolute impedance of said device being substantially $$\sqrt{3}$$

times the absolute impedance of one of said branch circuits, and a conductor completing a neutral connection from said star point to said first secondary circuit.

6. In phase sequence apparatus associated with a three-phase alternating-current circuit, a phase sequence filter having a pair of impedance branches, of substantially equal impedance values, said branches having impedance phase angles differing by substantially 60°, instrument transformer apparatus for supplying said filter, and an electroresponsive device connected in delta with said impedances to respond to a symmetrical component of a polyphase electrical condition of said circuit, the absolute impedance of said device being substantially $$\sqrt{3}$$

times the absolute impedance of one of said branches.

7. In phase sequence apparatus associated with a three-phase alternating-current circuit, a phase sequence filter having a pair of impedance branches of substantially equal absolute impedance values, said branches having impedance phase angles differing by substantially 60°, instrument transformer apparatus for supplying said filter, and an electroresponsive device connected in star with said impedances to respond to a symmetrical component of a polyphase electrical condition of said circuit, the absolute impedance of said device being substantially $$\sqrt{\tfrac{1}{3}}$$

times the absolute impedance of one of said branches.

8. In phase sequence apparatus associated with a three-phase alternating-current circuit, a phase sequence voltage filter having a pair of impedance branches of substantially equal absolute impedance values, said branches having impedance phase angles differing by substantially 60°, instrument transformer apparatus for supplying said filter, and an electroresponsive device connected in star with said impedance to respond to a symmetrical component of a polyphase electrical condition of said circuit, the absolute impedance of said device being substantially $$\sqrt{\frac{1}{3}}$$

times the absolute impedance of one of said branches.

WILLIAM A. LEWIS, Jr.